(12) United States Patent
Muehlschlegel

(10) Patent No.: US 8,354,801 B2
(45) Date of Patent: Jan. 15, 2013

(54) METHOD FOR PROGRAMMING ELECTRONIC OPERATING DEVICES FOR DISCHARGE LAMPS AND ELECTRONIC OPERATING DEVICE FOR DISCHARGE LAMPS

(75) Inventor: Joachim Muehlschlegel, Groebenzell (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 362 days.

(21) Appl. No.: 12/671,914

(22) PCT Filed: Aug. 3, 2007

(86) PCT No.: PCT/EP2007/058071
§ 371 (c)(1),
(2), (4) Date: Feb. 3, 2010

(87) PCT Pub. No.: WO2009/018853
PCT Pub. Date: Feb. 12, 2009

(65) Prior Publication Data
US 2011/0234116 A1 Sep. 29, 2011

(51) Int. Cl.
*H05B 37/00* (2006.01)
(52) U.S. Cl. .......................... 315/291; 315/294; 315/307

(58) Field of Classification Search ............. 315/DIG. 4, 315/291, 294, 295, 307, 308
See application file for complete search history.

(56) References Cited

U.S. PATENT DOCUMENTS

| 4,398,131 A | 8/1983 | Tarroux et al. |
| 2010/0327766 A1 * | 12/2010 | Recker et al. .................. 315/291 |

FOREIGN PATENT DOCUMENTS

| GB | 2018532 A | 10/1979 |
| WO | 9818296 A1 | 4/1998 |
| WO | 2006126240 A1 | 11/2006 |

OTHER PUBLICATIONS

International Search Report of PCT/EP2007/058071.

* cited by examiner

*Primary Examiner* — David H Vu

(57) ABSTRACT

A method for programming an electronic operating device is provided. The method may include programming the operating device via a slow on/off switching pattern of its supply voltage, the operating device being configured to automatically dim the connected light or lights on a time-control basis after programming, and choosing the time base of the on/off switching pattern used for programming such that a person can carry out the programming using a clock and an on/off switch for the supply voltage.

Figure 1:
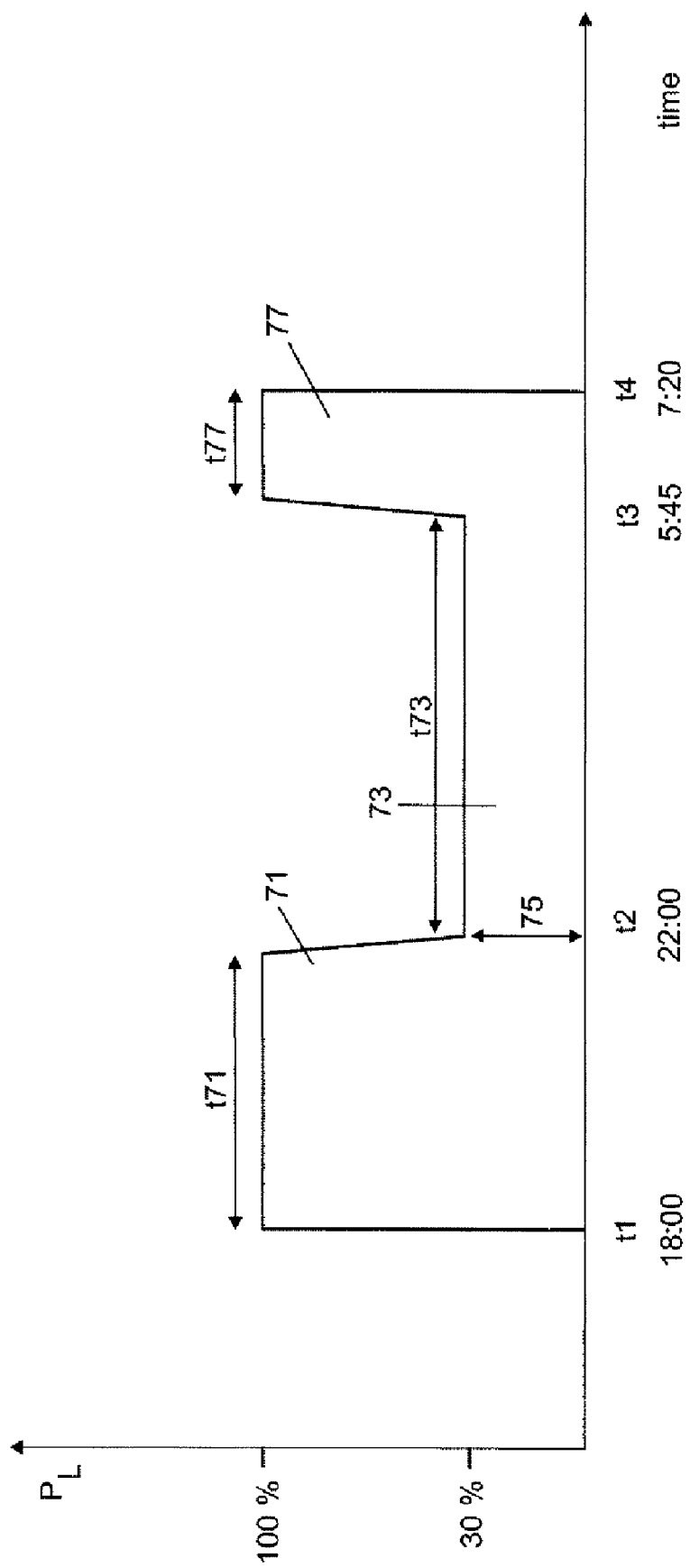

12 Claims, 2 Drawing Sheets

METHOD FOR PROGRAMMING ELECTRONIC OPERATING DEVICES FOR DISCHARGE LAMPS AND ELECTRONIC OPERATING DEVICE FOR DISCHARGE LAMPS

RELATED APPLICATIONS

The present application is a national stage entry according to 35 U.S.C. §371 of PCT application No.: PCT/EP2007/058071 filed on Aug. 3, 2007.

TECHNICAL FIELD

Various embodiments relate to electronic operating devices for discharge lamps, and e.g. to a method for programming electronic operating devices for discharge lamps.

BACKGROUND

There are a wide range of possible ways in the prior art for programming electronic operating devices for discharge lamps, for example wireless radio transmissions, additional control lines with proprietary protocols or standardized protocols for analog and digital interfaces (1..10V, DALI). Methods are also known for signal transmission on the mains line, for example the ripple control method of the electricity concerns or more modern methods such as "Powerline". All these methods require more or less complex additional circuit arrangements with input stages and special filters, which increase the cost of the electronic operating devices. If the operating devices are intended to be programmed only for different dimming levels and dimming times, then the abovementioned methods are too complex, and are therefore not worthwhile.

SUMMARY

Various embodiments specify a method for programming electronic operating devices for discharge lamps, which method no longer has the abovementioned disadvantages.

Various embodiments specify an electronic operating device for discharge lamps, which can be programmed using the abovementioned method.

The electronic operating device is programmed via an on/off switching pattern in which various parameters can be set by means of the switched-on time. Tables which are accessed via the switched-on times are stored in the operating device, and the parameters obtained from these tables are stored as operating parameters. These operating parameters relate, for example, to the time during which the electronic operating device operates the light at rated power, the time at which the electronic operating device operates the light in a dimmed form, and the dimming level. Any other desired parameters are, however, also feasible.

The last on/off switching pattern is preferably a checksum, in order to confirm correct detection of the previous parameters.

After receiving the on/off switching pattern, the electronic operating device preferably sends a response in the form of an on/off switching pattern to the lamp. The power supply remains switched on for the entire time during this.

This method according to the invention can be implemented in a standard operating device with virtually no additional costs. Since there is already a microcontroller in these devices, all that is necessary is to implement modified firmware and to create an internal time base.

BRIEF DESCRIPTION OF THE DRAWING(S)

Figure 2:
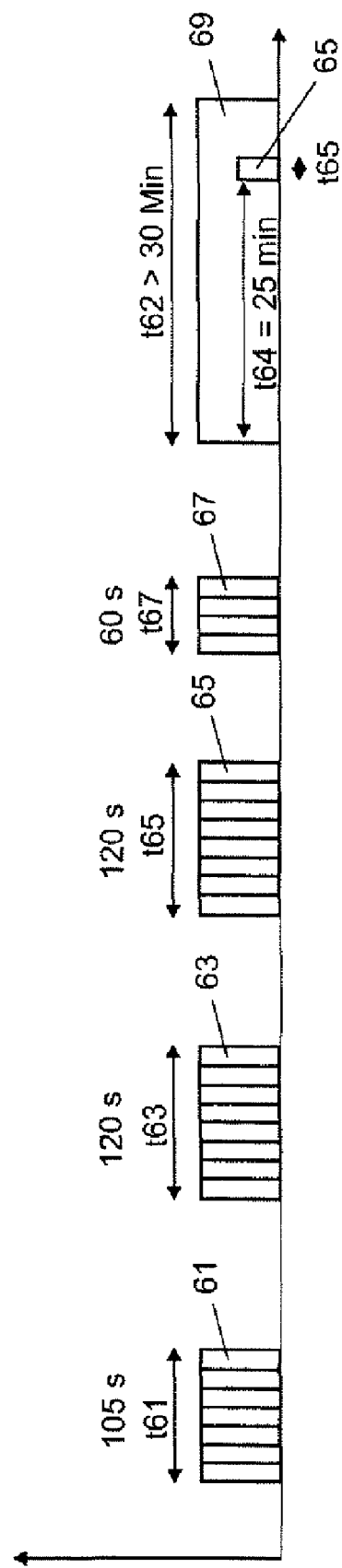

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a diagram of the lamp power programmed into the electronic operating device, plotted against time, for street lighting as an application, and FIG. 2 shows an illustration of the time profile of the programming method according to the invention.

DETAILED DESCRIPTION

The following detailed description refers to the accompanying drawings that show, by way of illustration, specific details and embodiments in which the invention may be practiced.

The preferred embodiment of the invention relates to an electronic operating device which is configured for street lighting. Operating devices such as these are often used as a replacement for conventional ballasts in old street lighting installations. During such modernization, there is often a requirement to dim the street lighting at night, in order to save energy. However, old installations generally have no additional lines which could be used as programming or control lines. As already mentioned initially, alternative programming methods for radio or Powerline are generally too expensive and complex. In a situation such as this, it is highly advantageous to use the programming method according to the invention.

By way of example, a light output as illustrated in FIG. 1 is desirable for street lighting with a night dimming mode. The lighting on a roadway is switched on at 18:00 hrs, and the operating devices operate the lamps at the rated power, that is to say at 100% (block 71 in the series of curves). This state should now be maintained for 4 h, after which the operating device should operate the lamps with a lamp power $P_L$ of 30% for 7 h 45 min (block 73 in the series of curves). At the end of the night, the lamps should be operated at rated power again until they are switched off (block 77 in the series of curves).

In this case, the parameters $t_{71}$, $t_{73}$ and $t_{75}$ can be programmed in the electronic operating device. In this example, the electronic ballast is switched on at the time $t_1$ by application of the supply voltage, and is switched off at the time $t_4$ by switching off the supply voltage. In this case, all the electronic operating devices for one or more roadways are switched. The electronic operating device should then automatically switch to a previously programmed dimming level at the previously programmed time $t_2$, and should switch back to 100% power again at time $t_3$.

In the example: $t_1$=1800 hrs, $t_2$=2200 hrs, $t_3$=0545 hrs and $t_4$=0720 hrs. In this case, the following choice is available for programming the parameters in the electronic ballast:

Parameter $t_{71}$ (evening lighting): 1 h to 5 h in 30 min steps. This therefore results in (5−1)*2+1=9 different parameter values.

Parameter $t_{73}$ (night lighting): 6 h to 8 h in 15 min steps. This therefore results in (8−6)*4+1=9 different parameter values.

Parameter $t_{75}$ (dim level): 70%, 60%, 55%, 50%, 45%, 40%, 35%, 30%. This therefore results in 8 different parameter values.

In this application, the programming is carried out with an on/off switching pattern in which there are 4 on-switching operations and 4 off-switching operations. In this case, each switched-on time is subdivided into 15 s sections; this means that the time resolution for the switched-on times is 15 s. The duration of the first switched-on time defines the parameter $t_{71}$ (evening lighting), as follows:

|  | Normalized duration of the 1st programming switch-on pulse $t_{61}$ | | | | | | | | |
| --- | --- | --- | --- | --- | --- | --- | --- | --- | --- |
|  | 1 | 2 | 3 | 4 | 5 | 6 | 7 | 8 | 9 |
| Duration of the 1st programming switch-on pulse $t_{61}$ | 15 s | 30 s | 45 s | 60 s | 75 s | 90 s | 105 s | 120 s | 135 s |
| Parameter $t_{71}$ | 10 min | 1 h 30 | 2 h | 2 h 30 | 3 h | 3 h 30 | 4 h | 4 h 30 | 5 h |

The duration of the second switch-on pulse defines the parameter $t_{73}$ (night lighting) as follows:

|  | Normalized duration of the 2nd programming switch-on pulse $t_{63}$ | | | | | | | | |
| --- | --- | --- | --- | --- | --- | --- | --- | --- | --- |
|  | 1 | 2 | 3 | 4 | 5 | 6 | 7 | 8 | 9 |
| Duration of the 2nd programming switch-on pulse $t_{63}$ | 15 s | 30 s | 45 s | 60 s | 75 s | 90 s | 105 s | 120 s | 135 s |
| Parameter $t_{73}$ | 6 h | 6 h 15 | 6 h 30 | 6 h 45 | 7 h 00 | 7 h 15 | 7 h 30 | 7 h 45 | 8 h |

The duration of the third programming switch-on pulse defines the parameter 75 (dimming level) as follows:

|  | Normalized duration of the 3rd programming switch-on pulse $t_{65}$ | | | | | | | |
| --- | --- | --- | --- | --- | --- | --- | --- | --- |
|  | 1 | 2 | 3 | 4 | 5 | 6 | 7 | 8 |
| Duration of the 3rd programming switch-on pulse $t_{65}$ | 15 s | 30 s | 45 s | 60 s | 75 s | 90 s | 105 s | 120 s |
| Parameter 75 | 70% | 60% | 55% | 50% | 45% | 40% | 35% | 30% |

The fourth programming switch-on pulse is used as a check on the programming, in a similar manner to a checksum.

In this case, the normalized duration is calculated as follows: 1+remainder which remains over when the sum of the normalized durations of the first 3 switch-on pulses is divided by 4.

The sum of the normalized switched-on durations of the first three programming pulses can assume the following value range:

3 (1+1+1) to 26 (9+9+8). The fourth switch-on pulse assumes the following values, using the above formula:

|  | Normalized duration of the fourth programming switch-on pulse $t_{67}$ | | | |
| --- | --- | --- | --- | --- |
|  | 1 | 2 | 3 | 4 |
| Duration of the 3rd programming switch-on pulse $t_{67}$ | 15 s | 30 s | 45 s | 60 s |
| For the sum of the first 3 normalized switched-on durations | 4, 8, 12, 16, 20, 24 | 5, 9, 13, 17, 21, 25 | 6, 10, 14, 18, 22, 26 | 7, 11, 15, 19, 23, 27 |

The process from FIG. 1 will now be programmed as an example, in order to illustrate the programming method according to the invention:

In this case the parameters in the electronic operating device can be chosen as follows:

$t_{71}$=4 h. The length of the evening lighting is intended to be 4 h. The first programming switch-on pulse $t_{61}$ therefore has a length of 105 s.

$t_{73}$=7 h 45. The length of the night lighting is intended to be 7 h 45 min. The second programming switch-on pulse $t_{63}$ therefore has a length of 120 s.

%. The dimming level is intended to be 30%. The third programming switch-on pulse $t_{65}$ therefore has a length of 120 s.

The normalized durations of the programming switch-on pulses can be used to calculate the monitoring pulse. This results in the following pattern: 7, 8, 8.

The sum of the normalized switch-on pulses is 7+8+8=23. The normalized switched-on duration of the fourth pulse (monitoring pulse) is therefore 1+remainder (23/4)=1+3=4.

The monitoring pulse therefore has a length of 60 s.

In order to program the electronic operating devices for street lighting, an on/off switching pattern as indicated in FIG. 2 must therefore be carried out. The power supply is switched on for 105 s after which it is switched off for an adequate time (the absolute length is in this case not very critical), and is then switched on again for 120 s, is switched off for an adequate time, and is then switched on again for 120 s, is switched off for an adequate time, and is finally switched on for 60 s, following which it is switched off again for an adequate time. The power supply is then switched on again for a certain response time $t_{62}$ in order to wait for the response from the electronic operating devices.

The on/off switching pattern therefore has specific time sequences with specific time conditions and sequence conditions. The electronic operating device can evaluate the sequence and the time duration of the on/off switching pattern, and can distinguish this from random voltage failure patterns.

It is, of course, also possible to program the electronic operating device by means of a digital bit sequence, in which case each bit represents switching on or off for a certain time, for example for 1-2 seconds. However, this has the disadvantage over the abovementioned method that the lights are switched on and off more frequently.

After the programming has been carried out, the electronic operating device responds during the response phase 69 with a specific time on/off switching pattern of the lamp. During this process, the supply voltage remains switched on during the time $t_{62}$, in which the electronic operating device is sending the response pattern.

The response can be evaluated either on the basis of the power consumed from the supply or on the basis of the current, or visually via the light, that is to say by means of visual checking and a clock, without any additional device. For example, the following information can be indicated by transmission or non-transmission and by the time duration of the response delay $t_{64}$, or the duration of the response pulse in the electronic ballast response: successful/invalid programming, feedback of a programming status (no. of the current dimming program) or the time before a lamp change is required.

In this case, the response delay is particularly highly suitable for parameters which differ for individual operating devices, or for a subset of the electronic operating devices.

By way of example, the response delay can be used to indicate simple feedback about the remaining usable lamp life (for example the remaining usable lamp life is proportional to the response delay). If the current draw or power consumption (or the light) of the roadway is in this case observed, it is easily possible to read the urgency of lamp replacement, from the rise in the current draw or power demand.

The response delay time $t_{64}$ is in the range 10 min to 30 min (this is necessary for high-pressure lamps). This is subdivided into a cooling-down waiting time (identical for all electronic operating devices) and a response data time (for transmission of a parameter such as the remaining usable lamp life). The response pulse duration $t_{65}$ of the response pulse 65 is in the range 1 s-20 min.

In order to allow the electronic operating device to correctly evaluate the programming pulses, a time base is required. There are a number of possible ways to adjust the internal timer (for example the clock frequency of the microcontroller). The electronic operating device may, for example, calibrate its time base from the mains frequency of the voltage supply. The electronic operating device may, however, also calibrate its time base from a specific programming pattern (for example using a reference time pulse which is likewise applied as a switch-on pulse during the programming). The electronic operating device uses at least one of these options in order to arrive at a suitable time base.

In a more advanced embodiment of the invention, the times that are programmed in are not absolute times but normalized times which, for example, relate only to a specific daytime length. Ratio components of the overall switched-on time are therefore programmed into the electronic operating device. This means that the electronic operating device automatically matches itself to different daylight times and night times, which means that it must be programmed only once, and always chooses the correct switched-on durations for the various dimming levels for different switched-on times (for example the difference between summer and winter operation).

For this purpose, the electronic operating device has a memory in which it stores the total switched-on duration $t_G$ when it is switched off in the morning. A quotient $$S = \frac{t_G}{(t_{71} + t_{73} + t_{77})}$$

is formed from the most recent total switched-on time $t_G$ and the programmed standard switched-on time $t_{71}+t_{73}+t_{77}$, and this is multiplied, as a factor, by the partial switched-on times ($t_{71}$, $t_{73}$, $t_{77}$). The time $t_r$ must also be programmed, in the manner described above, for this purpose. These times multiplied by the factor ($S*t_{71}$, $S*t_{73}$ . . . ) are then used as switched-on times. The programming is therefore matched in a simple manner to the current night-time length, therefore making it possible to use the programmed switched-on times throughout the entire year.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for programming an electronic operating device, the method comprising:
   programming the operating device via a slow on/off switching pattern of a supply voltage configured to provide a voltage supply to the operating device, the operating device being configured to automatically dim a connected light or connected lights on a time-control basis after programming, and
   choosing the time base of the on/off switching pattern used for programming such that a person can carry out the programming using a clock and an on/off switch for the supply voltage.

2. The method for programming an electronic operating device, as claimed in claim 1, wherein the on/off switching pattern comprises switching the various on and off switching times on and off between two and ten times.

3. The method for programming an electronic operating device as claimed in claim 1, wherein table values which are programmed into the operating device are accessed via the length of the on and/or off switching times and are used for programming the operating device.

4. The method for programming an electronic operating device as claimed in claim 3, wherein the switched-on periods are in the range between 0.5 seconds and 2 hours.

5. The method for programming an electronic operating device as claimed in claim 4, wherein the interval in order to distinguish between different switched-on periods is in the range from 0.2 seconds to 10 minutes.

6. The method for programming an electronic operating device as claimed in claim 1, wherein the operating device responds with a specific on/off switching pattern, of the lamp time after programming has been carried out.

7. The method for programming an electronic operating device as claimed in claim 6, wherein a further parameter is transferred from the operating device via the delay time which passes between switching the mains voltage on again at the end of the programming phase and the response from the operating device or via the duration of the response pulse.

8. The method for programming an electronic operating device as claimed in claim 7, wherein the further parameter which is passed back from the electronic operating device is the still-remaining life of the light which is connected to the operating device.

9. The method for programming an electronic operating device as claimed in claim 1, wherein the electronic operating device calibrates its time base on the basis of the mains frequency.

10. The method for programming an electronic operating device as claimed in claim 1, wherein the electronic operating device calibrates its time base on the basis of a specific programming pattern.

11. The method for programming an electronic operating device as claimed in claim 1, wherein the electronic operating device stores the previous switched-on times and thus the previous night-time durations, generates one or more factors from these switched-on times and the programming parameters, and multiplies these factors by the not realized partial switched-on times, in order to match the programmed standard switched-on times to the present night-time length.

12. An electronic operating device, comprising:
   a microcontroller;
   an internal time base; and
   firmware, the firmware being configured to implement a method for programming the electronic operating device, the method comprising:
   programming the operating device via a slow on/off switching pattern of its supply voltage, the operating device being configured to automatically dim the connected light or lights on a time-control basis after programming, and
   choosing the time base of the on/off switching pattern used for programming such that a person can carry out the programming using a clock and an on/off switch for the supply voltage.

* * * * *

UNITED STATES PATENT AND TRADEMARK OFFICE
CERTIFICATE OF CORRECTION

PATENT NO.        : 8,354,801 B2
APPLICATION NO.   : 12/671914
DATED             : January 15, 2013
INVENTOR(S)       : Joachim Muehlschlegel It is certified that error appears in the above-identified patent and that said Letters Patent is hereby corrected as shown below:

In the claims:

Col. 8, ln. 7, in claim 6, delete "pattern, of the lamp" and insert --pattern of the lamp--, therefor.

Col. 8, ln. 33, in claim 11, delete "realized" and insert --normalized--, therefor.

Signed and Sealed this
Twelfth Day of March, 2013

Teresa Stanek Rea
*Acting Director of the United States Patent and Trademark Office*